US008839109B2

(12) United States Patent
Speir et al.

(10) Patent No.: US 8,839,109 B2
(45) Date of Patent: Sep. 16, 2014

(54) DIGITAL VIDEO SYSTEM WITH INTELLIGENT VIDEO SELECTION TIMELINE

(75) Inventors: James P. Speir, Austin, TX (US); Geoffrey Prewett, Beijing (CN)

(73) Assignee: UTC Fire and Security Americas Corporation, Inc., Farmington, CT (US)

( * ) Notice: Subject to any disclaimer, the term of this patent is extended or adjusted under 35 U.S.C. 154(b) by 395 days.

(21) Appl. No.: 13/373,449

(22) Filed: Nov. 14, 2011

(65) Prior Publication Data
US 2013/0124997 A1    May 16, 2013

(51) Int. Cl.
| G06F 3/00 | (2006.01) |
| H04N 21/458 | (2011.01) |
| H04N 21/472 | (2011.01) |
| H04N 21/231 | (2011.01) |
| H04N 5/76 | (2006.01) |
| H04N 21/2747 | (2011.01) |
| H04N 5/783 | (2006.01) |
| H04N 9/82 | (2006.01) |
| H04N 5/765 | (2006.01) |

(52) U.S. Cl.
CPC ..... *H04N 21/47217* (2013.01); *H04N 21/4583* (2013.01); *H04N 5/783* (2013.01); *H04N 21/231* (2013.01); *H04N 5/76* (2013.01); *H04N 21/2747* (2013.01); *H04N 9/8205* (2013.01); *H04N 5/765* (2013.01)
USPC ........................... 715/720; 715/721; 715/722

(58) Field of Classification Search
USPC ......................... 715/720, 721, 722
See application file for complete search history.

(56) References Cited

U.S. PATENT DOCUMENTS

| 7,401,351 B2* | 7/2008 | Boreczky et al. ............... 725/88 |
| 2006/0034586 A1* | 2/2006 | Millar et al. .................... 386/69 |
| 2006/0070108 A1 | 3/2006 | Renkis |
| 2006/0171453 A1 | 8/2006 | Rohlfing et al. |
| 2010/0023865 A1 | 1/2010 | Fulker et al. |
| 2010/0135643 A1* | 6/2010 | Fleming ........................ 386/117 |
| 2011/0032353 A1 | 2/2011 | Vallone et al. |
| 2011/0119588 A1 | 5/2011 | Siracusano, Jr. |
| 2011/0228084 A1* | 9/2011 | Colciago ........................ 348/143 |

* cited by examiner

*Primary Examiner* — Omar Abdul-Ali
(74) *Attorney, Agent, or Firm* — Cantor Colburn LLP

(57) ABSTRACT

A digital video system comprises a plurality of recorders and a client device. The recorders store digital video from a common source. The client device comprises a screen, an input device, and a processor configured to run a graphical user interface (GUI). The GUI comprises a timeline, a selection indicator, availability indicators, and event tags. The timeline is adjustable by user input. The selection indicator is movable on the timeline by user input, and designates a time of interest. The availability indicators indicate aggregate availability statuses of video at each time on the timeline, from the plurality of recorders. The event tags indicate types and times or time ranges of events on the timeline. The client device is configured to receive video availability information from the plurality of recorders, and the processor is configured to update the GUI as the aggregate availability status of video changes.

20 Claims, 2 Drawing Sheets

DIGITAL VIDEO SYSTEM WITH INTELLIGENT VIDEO SELECTION TIMELINE

BACKGROUND

The present invention relates generally to video playback, and more particularly to a system and interface for navigating recorded digital video.

Video surveillance systems commonly include one or more video capture sources such as digital video cameras. Video from these sources is recorded and stored by digital recorders. Video from each source may be recorded by a plurality of recorders, and different recorders may utilize different video codecs, sampling ranges, or resolutions. Some recorders may only record video at particular times, or may store information for longer or shorter time periods. In addition, some recordings may be triggered by or associated with events such as alarm activations, personnel entry into or exit from monitored areas, or motion detections. A user interested in viewing video from a particular time and source will not necessarily know what video is available, either from a particular recorder, or from a collection of available recorders (e.g. recorders available over a network). Gathering this information on an as-requested basis can be time consuming, particularly when traffic at a particular recorder is high.

SUMMARY

The present invention is directed toward a digital video system comprising a plurality of recorders and a client device, and a method utilizing this system. The recorders are configured to store digital video from a common source. The client device comprises a screen, an input device, and a processor configured to run a graphical user interface (GUI). The GUI comprises a timeline, a selection indicator, availability indicators, and event tags. The timeline is adjustable by user input via the input device. The selection indicator is movable on the timeline by user input via the input device, and designates a time of interest. The availability indicators indicate aggregate availability statuses of video at each time on the timeline, from the plurality of recorders. The event tags indicate types and times or time ranges of events on the timeline. The client device is configured to receive video availability information from the plurality of recorders, and the processor is configured to update the GUI in real time as the aggregate availability status of video changes.

DETAILED DESCRIPTION

Figure 1:
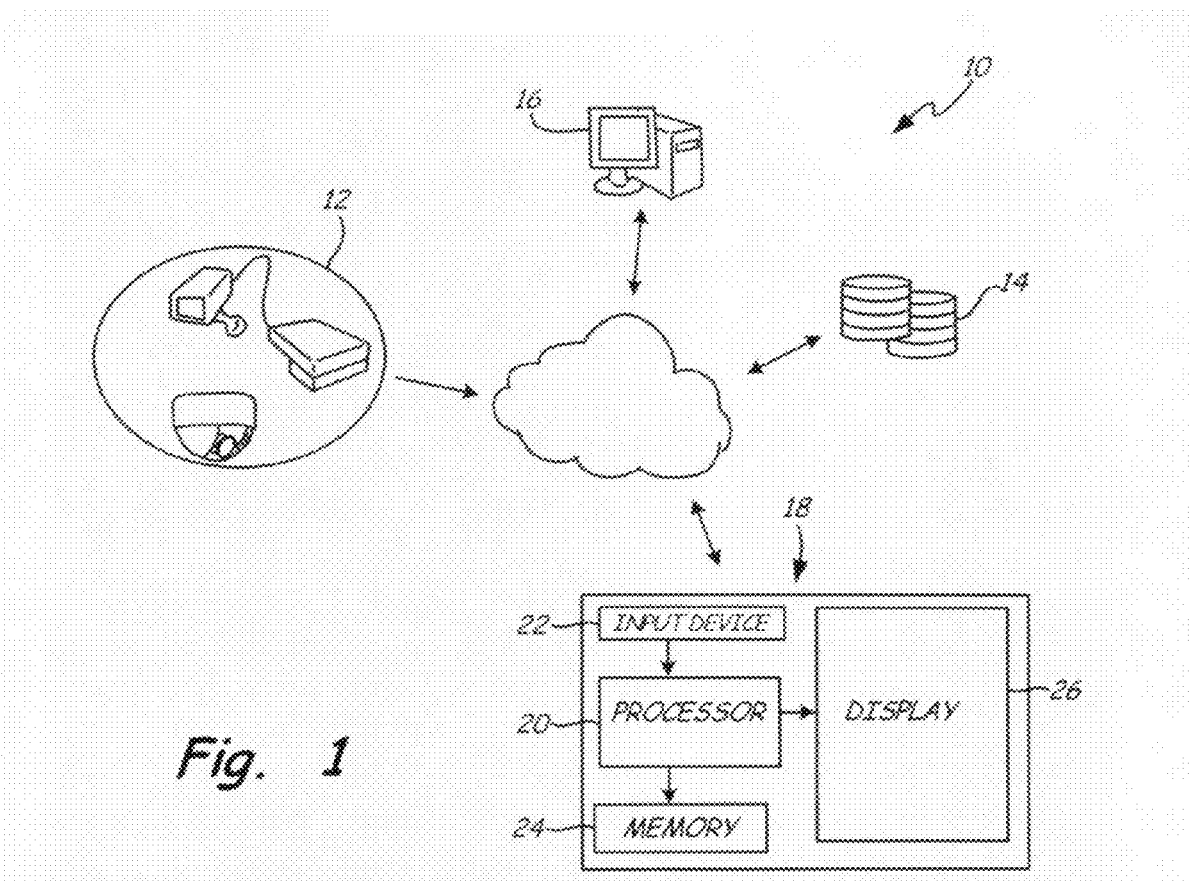
FIG. 1 is a block diagram of a video capture and replay network.

FIG. 1 is a block diagram of video system 10, comprising source 12, recorder 14, server 16, and user device 18. User device 18 has processor 20, input device 22, memory 24, and display 26. Source 12 is a video source such as a digital camera. Although only one source 12 is shown, many video sources may be included in video capture and playback network 10. Recorder 14 is a video recorder which encodes real time video from source 12, and stores encoded video in a machine-readable format. In some embodiments, source 12 and recorder 14 may communicate directly, while in other embodiments recorder 14 may receive video from source 12 only through video capture and playback network 10. Although only one recorder 14 is shown, many video recorders may be included in video capture and replay network 10, potentially including multiple recorders which encode video from source 12, as well as multiple recorders which encode video from other sources. Server 16 is a video management server which may catalogue, retrieve, or process video from recorder 14 for playback at user device 18. Alternatively, server 16 may catalogue video from recorder 14 and provide configuration information enabling user device 18 to directly retrieve and play back video from recorder 14. User device 18 is a logic-capable user-side video viewing device such as a personal computer, through which a user may view and manipulate video from source 12, recorder 14, or server 16. In some embodiments local server 16, recorder 14, and client device 18, or some combination thereof, may be logically separable parts of a single hardware computer. Local server 16 and client device 18 are computers with processors and hardware memory, and may be either specialized hardware computers or general purpose computers running specialized software for video management and viewing.

User device 18 receives archived video from recorder 14, either directly or via server 16. User device 18 includes processor 20, which may, for instance, be a conventional microprocessor. Processor 20 receives inputs from input device 22, which may be a keyboard, mouse, touch screen, or other conventional device for providing user input. User device 18 may have multiple input devices 22. Processor 20 reads from and writes to memory 24, and displays an image of selected video on display 26.

Users at client device 18 can review video collected by source 12 and available from recorder 14 (or from a plurality of sources or recorders, where video system includes more than one of either). Processor 20 runs graphical user interface (GUI) 100, which is viewable on display 26, as described below with respect to FIGS. 2 and 3. GUI 100 provides a real-time assessment of video availability from recorder 14 around a selected time.

Figure 2:
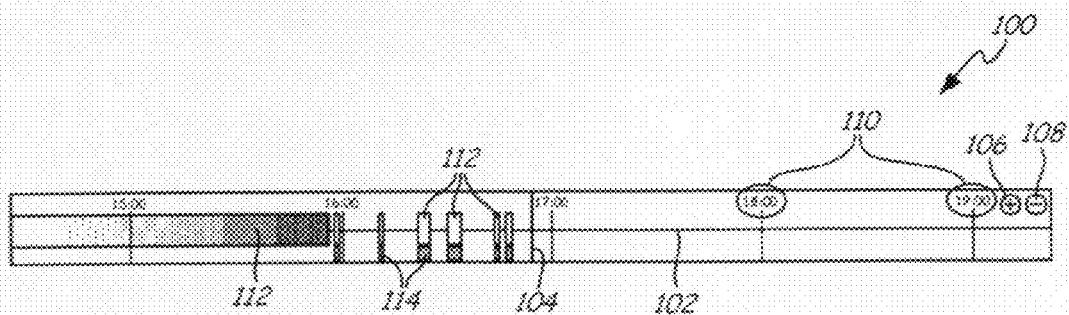
FIG. 2 is a simulated screenshot of a graphical user interface used to navigate video in the video capture and replay network of FIG. 1.

FIG. 2 is a simulated screenshot of GUI 100, comprising timeline 102, selection indicator 104, zoom-in button 106, zoom-out button 108, timestamps 110, availability indicators 112, and event tags 114. GUI 100 provides a visibly ascertainable indication of video availability in response to a user video request received via input device 22. Processor 20 processes and transmits this user video request to server 16, as described below with respect to FIG. 3. GUI 100 can be updated by processor 20 in real time, in response to information received from recorder 14 or server 16 in response to the user video request. GUI 100 may be a stand alone interface, or may be a part of a larger user interface incorporating other visible information such as streaming video. Within GUI 100, timeline 102 chronologically represents a range of available and unavailable video near a time of interest indicated by selection indicator 104. Selection indicator 104 indicates a selection time selected manually by a user, or automatically by software running on client device 18 or server 16. In one embodiment, the selection time may default to the time of the user video request.

Timeline 102 includes timestamps 110, which indicate the scale of timeline 102. As depicted, timestamps 110 occur at regular one hour intervals. The scale of timeline 102 can be adjusted by mouse clicking on zoom-in button 106 (to decrease the length of the time period depicted on timeline 102) or zoom-out button 108 (to increase the length of the time period depicted on timeline 102). Some embodiments may include alternative or additional means of adjusting the scale of timeline 102, such as by scrolling a mouse wheel, touching a touch-sensitive region of a touch-screen, or selecting a different scale from a drop-down menu. In addition, some embodiments of timeline 102 may include timestamps 110 at irregular intervals, such as at times coinciding with events or with start or stop times of available video. Selection indicator 104 may similarly be moved by mouse clicking an alternative location on timeline 102, by mouse dragging selection indicator 104 or timeline 102, or with key commands or touch-screen inputs. In some selection indicator 104 will always remain situated in the center of timeline 102, although timeline 102 may scroll back and forth through different times. In other embodiments, selection indicator 104 may be adjusted without changing the time displayed on timeline 102, and the time displayed on timeline 102 may be separately selected or adjusted. Some embodiments of GUI 100 may include a button or other input allowing a user at client device 18 to stream video from recorder 14 or server 16 beginning at the time indicated by selection indicator 104. In embodiments of GUI 100 which provide video playback, GUI selection indicator 104 or timeline 102 may advance in real time as video is played.

Availability indicators 112 are blocks or markings on timeline 102 which visually indicate the availability status of requested video at particular times. The width and location of availability indicators 112 on timeline 102 indicate time ranges. Availability indicators 112 have visible features such as color, texture, shading, or pattern which indicate a particular availability status. Availability statuses may include "currently available" (if video is presently available for streaming), "unavailable" (if no recorder 14 possesses video for the indicated time), "pending availability information" (if at least one recorder 14 has been ascertained to possess video for the indicated time, but that video is not yet ready for streaming), or "availability unknown" (if no information is yet available as to the availability of video at the indicated time). Video which is presently available for streaming may, by way of example, be indicated with a dark green availability indicator 112, while video which is not yet available, but soon will be, may be indicated with a light green availability indicator 112. In the depicted embodiment, time periods for which no availability information is known are indicated by a gradient block, while time periods for which video is known to be unavailable are indicated by empty areas on timeline 102 (i.e. areas without any availability indicator 112).

Availability indicators 112 can be updated in real time by processor 20 in response to information received from server 16 or recorder 14, as video becomes available or unavailable. As described in further detail below, server 16 and/or client device 18 may prioritize the collection of availability information close to the time of interest indicated by selection indicator 104, eventually collecting availability information for time periods progressively further from that time of interest. As new availability information becomes available (i.e. periods with unknown availability become known as available or unavailable, or periods with pending availability become actually available), availability indicators 112 are updated accordingly. Availability indicators 112 are tied to timeline 102, and are scaled and translated with timeline 102, in the manner described above with respect to timeline 102 and selection indicator 104.

As noted previously, some surveillance systems may record surveillance events, either at particular times, or for particular time ranges. Surveillance events may for instance include alarm activations, personnel entry into or exit from monitored areas, and motion detections, and are timestamped with at least a start time, and in some embodiments with both a start and an end time. Surveillance events may further be associated with particular time periods of captured video; for instance, a recorder may not record video by default, by may record video for a period of seconds or minutes in response to alarm activation or motion detection within a camera field of view. Event tags 114 are positioned along timeline 102 and adjacent to availability indicators 112, and allow users at client device 18 to visually ascertain that certain time periods of available or unavailable video correspond to particular events. Like availability indicators 112, event tags 114 may be coded by color, texture, shading, or pattern so that users can ascertain at a glance the type of event indicated by each event tag 114 (e.g. alarm activation, periodic wakeup, etc.). In some embodiments, graphical user interface 100 may be responsive to mouse movements such that additional information appears when the user mouses over event tags 114 or availability indicators 112. This additional information may include a description of associated events, precise start and stop times of events or available video, and information about the particular recorder and/or source from which video was taken.

Figure 3:
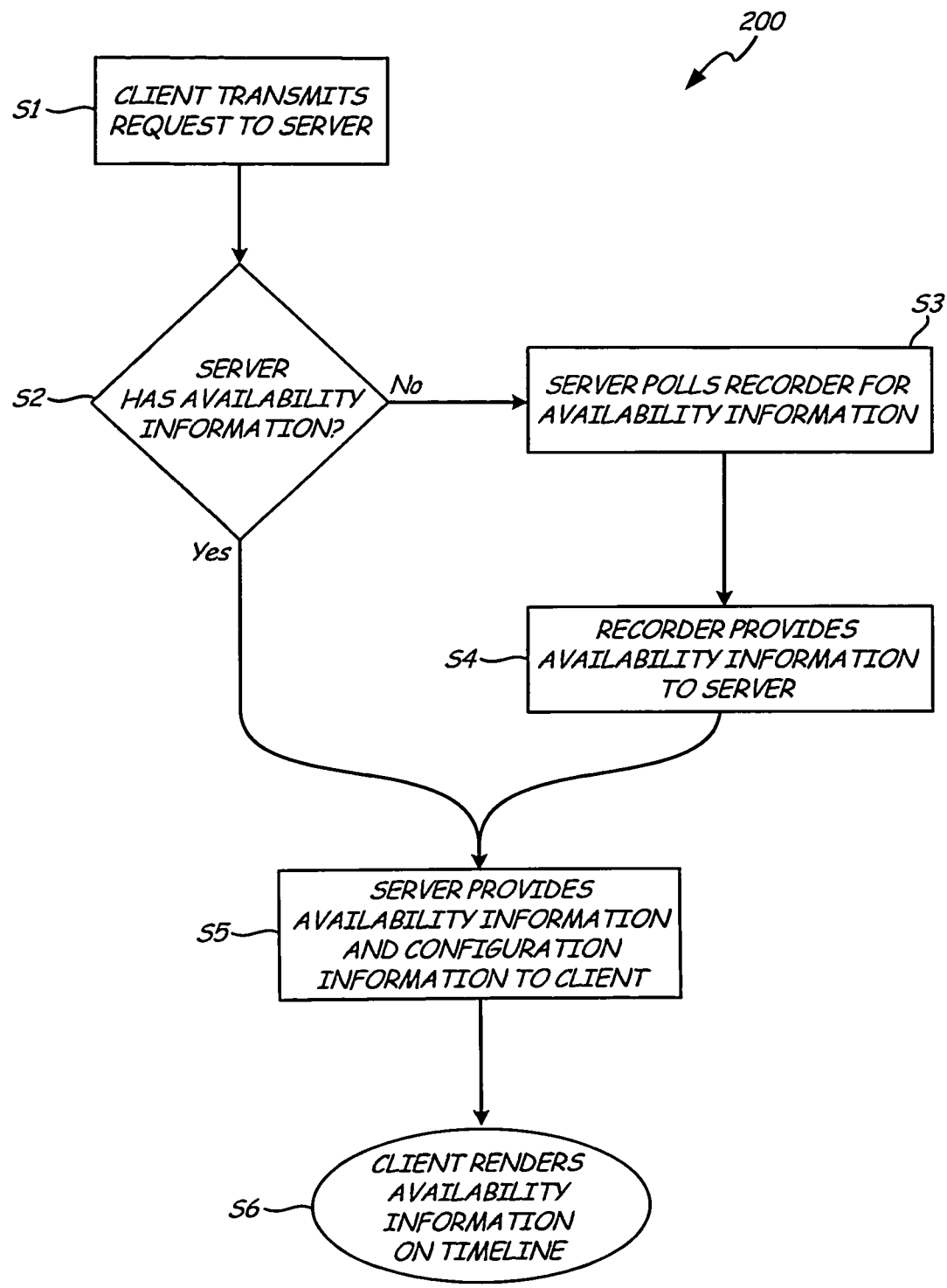
FIG. 3 is a flowchart of a method for retrieving and displaying video availability information using the graphical user interface of FIG. 2.

FIG. 3 is a flowchart of method 200 for retrieving and displaying video availability information, comprising steps S1 through S6. Client 18 first transmits a user request entered via input device 22 to server 16. (Step S1). This user request contains at least an indication of a desired source 12. In some embodiments the user request further contains a time of interest indicating the time or time range of video initially requested by the user. This time of interest may be designated by the user via input device 22. Alternatively, client 18 or server 16 may assume a default time of interest in the absence of a stated user preference, e.g. for the present time. In some embodiments, the user request may be accompanied by a digital certificate indicating user or client device permissions to access requested video.

Server 16 processes the user request, and ascertains whether any of the requested availability information is already locally available on server 16. (Step S2). Server 16 may in some embodiments keep a log of some or all video availability during certain time periods (e.g. for the past week). Server 16 may alternatively keep a limited record of video availability. By way of example, server 16 may maintain a database of which recorders and sources wherein each source is associated with one or more recorders which record data from that source, during broad time ranges (i.e. recorder A records from source X, and stores video for one year, while recorder B records from source X, but only stores for two days). In such cases, server 16 may locally store some, but not all, availability information requested by client device 18 in step S1. Server 16 may also have availability information locally cached if another recent request from client device 14 or another client device 14 necessitated its retrieval. For embodiments of video system 10 which provide users with event information (i.e. via event tags 114 of GUI 100), server 16 may also check for locally stored event information.

If server 16 lacks any part of the availability (or event) information requested in the user request, server 16 polls recorder 14 for this information. (Step S3). In systems having multiple recorders 14, server 16 may poll any or all recorders 14. Where server 16 has partial availability information available locally, as described above, server 16 may poll only the subset of recorders 14 which might possess requested video, according to this partial availability information. Each polled recorder 14 responds with an indication of time ranges of stored video available from that recorder 14 from the source specified by the user request. (Step S4). For embodiments of video system 10 which provide users with event information, polled recorders 14 may also transmit event descriptions, start times, and stop times to server 16.

Upon receiving availability information from recorder(s) 14, or upon ascertaining that all requested availability information is locally available, server 16 replies to the user request with an availability message indicating what video is available, and from where. (Step S5). This availability message includes an identification not only of the time ranges for which video is available from the collective plurality of recorders 14, but also an indication of what ranges of video are available from which recorders, as well as any configuration information (such as codec selections, authentication keys, and connection protocols) needed for client device 18 to stream video from each recorder 14 having available requested video. Where requested video is available from more than one recorder 14, server 16 assembles the availability message based on the aggregate availability of video from all recorders 14. Where more than one recorder 14 possesses requested video from the same time range, the availability message may include availability information for all such recorders, or may transmit availability information for only one such recorder selected from the plurality of recorders according to criteria such as highest resolution or frame rate, lowest traffic, or closest proximity to server 16 or client device 18. Where appropriate, the availability message may also contain event information, as described above.

Client device 18 receives the availability message from server 16, and renders timeline 102 in GUI 100, on display 26. (Stem S6). As discussed with respect to FIG. 2, availability indicators 112 and event tags 114 are rendered on timeline 102 to indicate the availability status of video from recorder(s) 14, and the nature or existence of any corresponding events. Although steps S4, S5, and S6 are depicted as discrete steps, recorders 14 may provide availability information over an extended period of time. This period of time may be prolonged, particularly if recorder 14 is experiencing high traffic. Accordingly, client 16 may receive a succession of messages carrying availability information from recorder 14 (rather than a single reply), and may transmit availability information to client device 18 as it is received, or periodically, rather than all at once. Accordingly, processor 20 periodically or reactively updates GUI 100 on display 26 to show up-to-date availability information.

As mentioned above, client device 18 or server 16 may not initially request availability information about all times. Instead, client device 18 or server 16 may begin by requesting availability (and event) information about a time period close to the time of interest designated by selection indicator 104, iteratively retrieving availability information successively further forward and/or backward along timeline 102 as time progresses. This prioritization rapidly provides client device 18 with availability information most likely to be relevant to the user, without overburdening recorders 14. As additional availability information is requested and retrieved, processor 200 periodically or reactively updates GUI 100 on display 26.

The prioritized availability information retrieval method described above may be repeated iteratively until all relevant video availability information has been provided, or may be limited. For instance, client device 18 may continue to request availability information and update GUI 100 only until a time range of interest has been covered. This time range may be manually specified by the user, or may default to a fixed time period (e.g. all video from the same day) or a fixed time range surrounding the time of interest indicated by selection indicator 104 (e.g. all video within twelve hours of the time of interest). As described above with respect to FIG. 2, GUI 100 allows users to change the time of interest indicated by selection indicator 104 by mouse clicking, dragging, or otherwise providing input via input device 22. When the user moves selection indicator 104, subsequent availability requests may prioritize availability information for times close to the new indicated time of interest. Similarly, GUI 100 allows users to alter the time range displayed on timeline 102 by mouse-wheeling or clicking zoom-in button 106 or zoom-out button 108. In some embodiments, zooming in or out in this way alters the ranges of times for which availability information is eventually retrieved.

The present invention allows a user to ascertain at a glance, in real time, what video is available for playback. The user can scan backwards and forwards along timeline 102 to check the availability of video during other time ranges, and can zoom in or out to view a narrower or broader time range, as desired. The present invention allows the user to distinguish between times for which no video is available, times for which video is presently available, times for which video will shortly be available, and times for which video availability is not yet known. Finally, the present invention provides all of this information while reducing network and recorder traffic by prioritizing retrieval of availability data for times close to an indicated time of interest.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of operating a client device in a digital video system, the method comprising:
   receiving a user request for video availability information, the request including a time of interest and a video source;
   retrieving, for a first time period near the time of interest, a first availability message indicating an aggregate availability of video from the video source, the aggregate availability comprising an availability status of video from among a plurality of recorders configured to record video from the video source, at each time within the first time period;
   rendering a timeline on a screen in a graphical user interface (GUI), the timeline comprising:
      a selection indicator designating the time of interest; and
      an availability indicator indicating the availability status of video from any of the plurality of recorders, for each time within the time of interest, the availability indicator being positioned in the timeline, the availability status distinguishing between available video and unavailable video;
   retrieving additional availability messages for successively wider time periods near the time of interest; and
   updating the rendered timeline according to the additional availability messages.

2. The method of claim 1, wherein the first availability message and all additional availability messages are retrieved from a video server in communication with the client device and the plurality of video recorders.

3. The method of claim 1, wherein the first time period is a first range of time centered on the time of interest, and wherein the successively wider time periods supplement the first time period.

4. The method of claim 1, further comprising retrieving event information from the plurality of recorders, and wherein the timeline further comprises event tags identifying events and event start times.

5. A method of operating a client device in a digital video system, the method comprising:
   receiving a user request for video availability information, the request including a time of interest and a video source;
   retrieving, for a first time period near the time of interest, a first availability message indicating an aggregate availability of video from the video source, the aggregate availability comprising an availability status of video from among a plurality of recorders configured to record video from the video source, at each time within the first time period;
   rendering a timeline on a screen in a graphical user interface (GUI), the timeline comprising:
      a selection indicator designating the time of interest; and
      an availability indicator indicating the availability status of video from any of the plurality of recorders, for each time within the time of interest;
   retrieving additional availability messages for successively wider time periods near the time of interest; and
   updating the rendered timeline according to the additional availability messages;
   wherein the availability status distinguishes between available video, unavailable video, video with pending availability, and video with unknown availability.

6. The method of claim 5, wherein each availability indicator distinguishes between available video, unavailable video, video with pending availability, and video with unknown availability.

7. The method of claim 1, further comprising:
   receiving streaming video from recorders selected based on the first availability message or the additional availability messages; and
   advancing the time of interest and the selection indicator in real time, as video is streamed.

8. The method of claim 1, further comprising:
   adjusting the time of interest in response to user input via the GUI; and
   retrieving subsequent additional availability messages for time periods near the adjusted time of interest.

9. A digital video system comprising:
   a plurality of recorders configured to store digital video from a common source; and a client device having a screen, an input device, and a processor configured to run a graphical user interface (GUI), the GUI comprising:
   a timeline adjustable by user input via the input device;
   a selection indicator movable on the timeline by user input via the input device, to thereby designate a time of interest;
   availability indicators positioned in the timeline, the availability indicators indicating an aggregate availability status of video at each time on the timeline from the plurality of recorders, the availability status distinguishing between available video and unavailable video; and
   event tags indicating types and times or time ranges of events on the timeline;
   wherein the client device is configured to receive video availability information from the plurality of recorders, and the processor is configured to update the GUI as the aggregate availability status of video changes.

10. The digital video system of claim 9, wherein a time scale of the timeline is adjustable via a zoom user input of the input device.

11. The digital video system of claim 9, wherein a visible range of the timeline is adjustable via a range user input of the input device.

12. A digital video system comprising: a plurality of recorders configured to store digital video from a common source; and a client device having a screen, an input device, and a processor configured to run a graphical user interface (GUI), the GUI comprising:
   a timeline adjustable by user input via the input device;
   a selection indicator movable on the timeline by user input via the input device, to thereby designate a time of interest;
   availability indicators indicating an aggregate availability status of video at each time on the timeline from the plurality of recorders; and
   event tags indicating types and times or time ranges of events on the timeline;
   wherein the client device is configured to receive video availability information from the plurality of recorders, and the processor is configured to update the GUI as the aggregate availability status of video changes;
   wherein each aggregate availability status and availability indicator distinguishes between video available from at least one of the plurality of recorders, video unavailable from any of the plurality of recorders, video with pending availability from at least one of the plurality of recorders, and video with availability not yet known from any of the plurality of recorders.

13. A digital video system comprising: a plurality of recorders configured to store digital video from a common source; and a client device having a screen, an input device, and a processor configured to run a graphical user interface (GUI), the GUI comprising:
   a timeline adjustable by user input via the input device;
   a selection indicator movable on the timeline by user input via the input device, to thereby designate a time of interest;
   availability indicators indicating an aggregate availability status of video at each time on the timeline from the plurality of recorders; and
   event tags indicating types and times or time ranges of events on the timeline;
   wherein the client device is configured to receive video availability information from the plurality of recorders, and the processor is configured to update the GUI as the aggregate availability status of video changes;
   wherein each availability indicator designates a single recorder from a subset of the plurality of recorders possessing video at a corresponding time, the single recorder selected from the subset of the plurality of recorders according to criteria including resolution and frame rate of available video, recorder traffic, and recorder proximity to the client device.

14. The digital video system of claim 9, wherein the GUI further comprises timestamps identifying times along the timeline.

15. The digital video system of claim 9, wherein the GUI provides further event or availability information in response to user action positioning a mouse cursor over the availability indicators or the event tags.

16. A video recording and playback system comprising:
a video source;
a recorder which digitally records at least some video from the video source;
a server configured to poll the recorder for video availability information; and
a client device comprising a display, an input device, and a processor configured to render a graphical user interface (GUI) on the display, the GUI comprising:
a timeline adjustable by user input via the input device;
a selection indicator movable on the timeline by user input via the input device, to thereby designate a time of interest; and
an availability indicator positioned in the timeline, the availability indicator indicating a current availability status of video at each time on the timeline, the availability status collected from the recorder by the server, the availability status distinguishing between available video and unavailable video.

17. The video recording and playback system of claim 16, wherein the recorder is one of a plurality of recorders, all of which record at least some video from the video source, and wherein the server produces the current availability status of video at each time by aggregating video information received by polling the plurality of recorders.

18. The video recording and playback system of claim 17, wherein the server is configured to maintain a database associating each of the plurality of recorders with recording the video source, recording times, and/or video storage durations.

19. A video recording and playback system comprising:
a video source;
a recorder which digitally records at least some video from the video source;
a server configured to poll the recorder for video availability information; and
a client device comprising a display, an input device, and a processor configured to render a graphical user interface (GUI) on the display, the GUI comprising:
a timeline adjustable by user input via the input device;
a selection indicator movable on the timeline by user input via the input device, to thereby designate a time of interest; and
an availability indicator indicating a current availability status of video at each time on the timeline, the availability status collected from the recorder by the server;
wherein the availability status distinguishes between available video, unavailable video, video with pending availability, and video with unknown availability.

20. The video recording and playback system of claim 16, wherein the client device is further configured to receive streamed video from the recorder using the availability status collected from the recorder by the server.

\* \* \* \* \*